United States Patent [19]
Goldman et al.

[11] Patent Number: 5,535,216
[45] Date of Patent: Jul. 9, 1996

[54] MULTIPLEXED GAPPED CONSTANT BIT RATE DATA TRANSMISSION

[75] Inventors: Matthew S. Goldman, Marlborough; Jeffrey B. Mendelson, Shrewsbury, both of Mass.

[73] Assignee: Digital Equipment Corporation, Maynard, Mass.

[21] Appl. No.: 373,727

[22] Filed: Jan. 17, 1995

[51] Int. Cl.$^6$ .................................. H04J 3/06; H04N 7/13
[52] U.S. Cl. ..................... 370/100.1; 370/112; 327/144; 327/162; 348/7; 348/423; 375/354
[58] Field of Search .................................. 370/79, 84, 94.1, 370/94.2, 100.1, 101, 102, 103, 105.3, 111, 112; 375/354, 356, 359, 361, 371, 373, 376; 348/4, 7, 390, 423, 500, 512; 327/141, 144, 151, 160, 162; 331/18, 25, 46, 55

[56] References Cited

U.S. PATENT DOCUMENTS

| | | | |
|---|---|---|---|
| 3,936,604 | 2/1976 | Pommerening | 370/103 |
| 4,142,069 | 2/1979 | Stover | 375/356 |
| 4,196,315 | 4/1980 | Boutmy et al. | 370/102 |
| 4,305,045 | 12/1981 | Metz et al. | 375/376 |
| 4,785,464 | 11/1988 | Judeinstein et al. | 375/211 |
| 5,204,882 | 4/1993 | Chao | 375/354 |
| 5,371,532 | 12/1994 | Gelman et al. | 348/7 |
| 5,381,181 | 1/1995 | Deiss | 348/423 |

OTHER PUBLICATIONS

Author: MacInnis, A. G. Title: "Coding of Audio, Picture, Multimedia and Hypermedia Information" Secretariat: Japan (JISC) ISO/IEC JTC 1/SC 29 N 820, dated Jun. 13, 1994 Complete article—122 pages.

*Primary Examiner*—Alpus H. Hsu
*Attorney, Agent, or Firm*—Dirk Brinkman; Ronald C. Hudgens; Arthur W. Fisher

[57] ABSTRACT

A communications controller coupled to a synchronous network generates local clock reference signals from network clock signals. The network clock signals are used to transport data over the network at a constant rate. The controller receiving a bit stream while generating the local clock reference signals. The bit stream including program clock reference signals, the program clock reference signals being independent of the network clock signals. The program clock reference signals are extracted from the bit stream and compared, after normalization, with the local clock reference signals. If the program clock reference signals are, time-wise, in advance of the local clock reference signals, transport of the bit stream is suspended, otherwise the bit steam is transported over the network. While transport of the bit stream is suspended, data from an alternative bit stream can be transported.

4 Claims, 9 Drawing Sheets

| | |
|---|---|
| 241 | ADAPT. FIELD LENGTH |
| 242 | DISC. INDICATOR |
| 243 | RANDOM ACCESS INDICATOR |
| 244 | ELEM. STREAM PRIORITY INDICATOR |
| 245 | PCR FLAG |
| 246 | OPER FLAG |
| 247 | SPLICING POINT FLAG |
| 248 | TRANS. PRIV. DATA FLAG |
| 249 | ADAPT. FIELD EXT. FLAG |
| 250 | OPT. FLD. |
| 229 | PAD BYTE |

MULTIPLEXED GAPPED CONSTANT BIT RATE DATA TRANSMISSION

FIELD OF THE INVENTION

This invention relates generally to data communications, and more particularly to communicating bit streams using synchronous networks.

BACKGROUND OF THE INVENTION

In video-on-demand systems, programs are typically transported from central repositories to subscriber locations as bit streams using communications networks. The bits of the bit streams are usually communicated over the networks in a contiguous maimer, and at a constant rate which is synchronized to a network clock.

The programs, which may include video and audio components, can represent games, movies, sporting events, and so forth. To reduce the bandwidth required to transport the bit streams, the source programs are usually encoded and compressed according to some industry standard, for example the Moving Pictures Experts Group (MPEG) standard, see "Generic Coding of Moving Pictures and Associated Audio," ISO/IEC 13818-1, June 1994. To conserve time and resources, the programs, if possible, are usually stored in the encoded form, so that they may be available on-demand. The encoded bit streams can deliver programs having a quality suitable for entertainment at rates in the range of one to six Megabits per second (Mb/s). At the subscriber locations, the bit streams are decoded and decompressed to reconstruct the programs.

In order to avoid distortion of a program, the bandwidth of the encoded bit stream is carefully matched to the bandwidth of the network that will be used to transport the bit stream. This makes sense. If the bit stream were to be delivered at a rate which is different than the encoded rate, the program would be distorted in color, sound, and motion. Furthermore, if the program were delivered at a much higher rate, storage buffers at the subscriber locations, used during decoding of the bit stream, would quickly overflow, resulting in a total loss of the program.

Traditionally, a process known as "padding" has been used to equalize the rate at which the bit stream is encoded with the rate at which the network will transport the bit stream. Padding adds extra "null" bits into the bit stream for portions of the program which would otherwise use less than the network bandwidth. For example, if a one second portion of a program, perhaps a static and silent image, is encoded into a bit stream which only takes 0.8 seconds to transport, the bit stream is padded with 0.2 seconds of meaningless null bits. Thus, the program is delivered at the correct rate.

There are several problems with padding bit streams. In order to add exactly the right number of bits to the bit stream, the encoding process must know the bit rate of the network that will be used to transport the bit stream. However, all synchronous communications networks do not necessarily transport bits at the same rate. In fact, in many instances, the rate at which the network will operate is not known until a communications circuit is established between the program repository and the subscriber location. Therefore, the program must be encoded every time it is delivered, or multiple copies of the encoded bit stream must be maintained, one copy for each possible network bit rate. Also, as the bandwidth of the public networks are upgraded to communicate at higher bit rates, previously encoded programs will need to be re-encoded.

Furthermore, padding consumes time and resources. The pad bits have to be added while encoding, and removed while decoding. Irrelevant pad bits occupy storage media, and require transport bandwidth. Additionally, it may not always be possible to exactly match the bandwidth of the padded bit stream with the bandwidth of the network since synchronous networks usually transport bit streams in units of fixed size packets or cells, for example, packets or cells having 188 or 53 octets (bytes) of bits. Therefore, the resolution of the padding is limited by the size of the transport units.

Therefore, it is desired to provide a system and method for transporting bit streams having variable bandwidth requirements over a synchronous communications network.

SUMMARY OF THE INVENTION

In a video-on-demand system, source programs are encoded into a bit stream. The encoded bit stream includes embedded program clock reference signals to enable the reconstruction of the original program at a correct program rate. A communications controller coupled to a synchronous communications network generates local clock reference signals from network clock signals. The network clock signals, which are independent of the program clock reference signals, are used to transport the bit stream over the network at a constant rate. The controller receives the bit stream while maintaining the local clock reference signals. The program clock reference signals are extracted from the bit stream and compared, after normalization, with the local clock reference signals. If the program clock reference signals are, time-wise, in advance of the local clock reference signals, transport of the bit stream is suspended, otherwise the bit steam is transported over the network. While transport of the bit stream is suspended, dam from a secondary bit stream can be transported over the network.

In a preferred embodiment of the invention, the controller includes a random access memory. The memory can store a plurality of local clock reference signals, one for each of a plurality of bit streams being concurrently transported. The values stored in the memory are addressable by an index which is derived from identifications of the programs.

BRIEF DESCRIPTION OF THE DRAWINGS

FIGS. 2–6 are block diagrams of a portion of a bit stream representing an encoded video program;

DETAILED DESCRIPTION OF A PREFERRED EMBODIMENT

Figure 1:
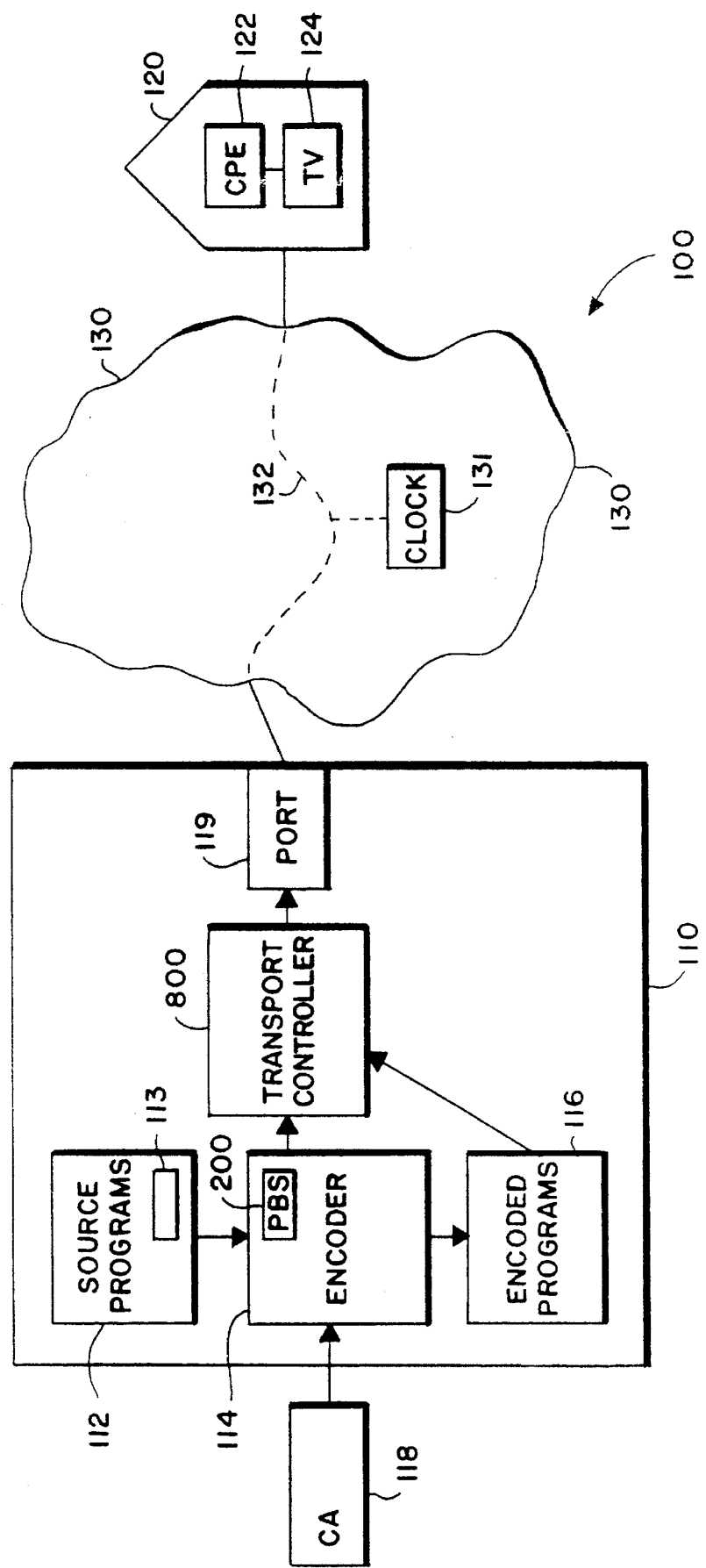
FIG. 1 is a block diagram of a video-on-demand system according to the invention.

FIG. 1 shows a video-on-demand system 100 for delivering programs from a repository 110 to a subscriber location 120 via a communications network 130.

The repository 110 can include a storage device 112 for storing source programs such as movies, games, and so forth. The source programs can include a plurality of elementary visual and audio components. The device 112 can be in the form of magnetic or optical media configured as, for example, tapes or disks arranged as a "video juke-box." An encoder 114 is used to convert a source program 113, usually in analog form, to an encoded primary bit stream (PBS) 200. 200 having a standard format, in digital form. The encoder 114 generates timing signals which are incorporated into the bit stream 200 to allow the reconstruction of the original program at a correct rate. The timing signals, called program clock references (PCRs), are described in greater detail below.

The encoded bit stream 200 can be stored on a disk device 116 configured as a video juke-box of encoded programs. The encoder 114 can also receive "live" programs from, for example, a camera 118 which can be remote from the repository 110. A communications port 119 connects the repository 110 with the communications network 130.

The network 130 communicates the bits of the bit stream 200 in a contiguous manner, and at a constant rate which is synchronized to a network clock 131. The network clock 131 typically is a cesium based atomic clock signalling, for an exemplary synchronous network, at a rate of, for example, 149.76 MHz. The network 130 can be a public switched network, a private cable network, satellite links, and the like. The protocols and transmission rates used to transport the bit stream 200 may not be determinable until a communications circuit 132, shown as a dashed-line, is established between the repository 110 and the subscriber location 120.

At the subscriber location 120, customer premises equipment (CPE) 122 is connected to the network 130 by a cable, telephone line, or, perhaps, a satellite dish. The CPE 122 is commonly known as the "TV set-top box." The CPE 122 can include memory buffers for temporarily storing the received bit stream while the bit stream is decoded and decompressed. The reconstructed program can be seen and heard using a viewing device 124, for example, a television or a personal computer.

During operation of the video-on-demand system 100, a subscriber initiates the connection with the repository 110. After the communications circuit 132 is established, the subscriber selects a program for viewing using, for example, menus displayed on the viewing device 124.

In accordance with the principles of the invention, the selected program is delivered to the network 130 via a transport controller 800 described in greater detail below. The transport controller 800 "meters" out the encoded bit stream to the port 119 at a rate which is synchronized to the network clock 131 used for the circuit 132, even if the bit stream 200 was encoded to transport at a rate which is different from the rate of the circuit 132 established for the current program delivery.

Figure 2:
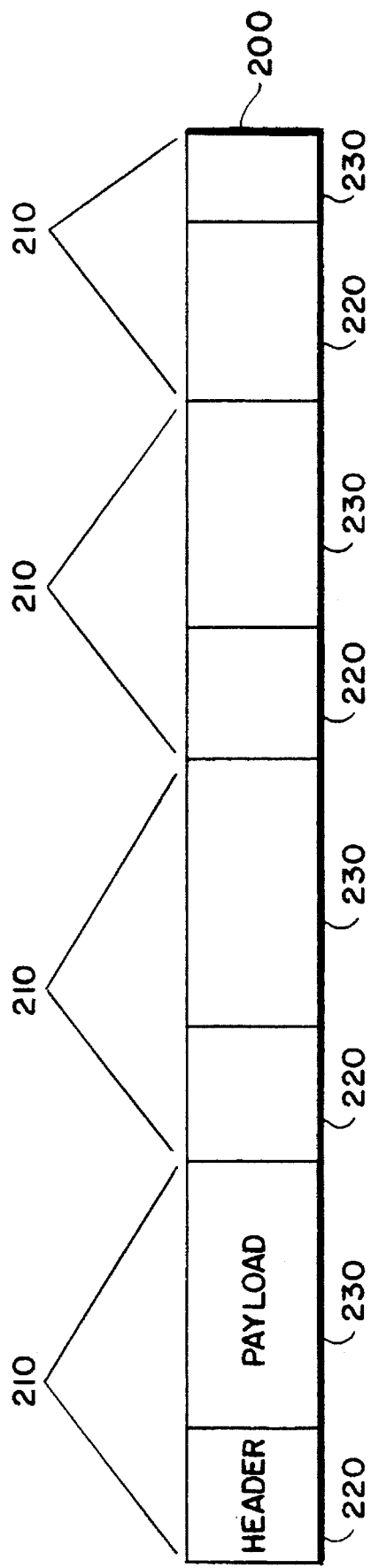

Turning now to FIG. 2, there is shown a portion of a bit stream 200 which represents the selected program after encoding and compressing according to the MPEG standard. The bit stream 200 is organized into a plurality of bit packets 210. Each packet 210 includes, for example, 188 octets (bytes) of bits. Each packet 210 includes a header 220 and a payload 230. The headers 220 include information necessary to decode the bits of the payloads 230. The payloads 230 include the elementary encoded components of the program, for example, audio and video signals. The payload can be "timed" data or "private" data, explained in greater detail below.

Figure 3:
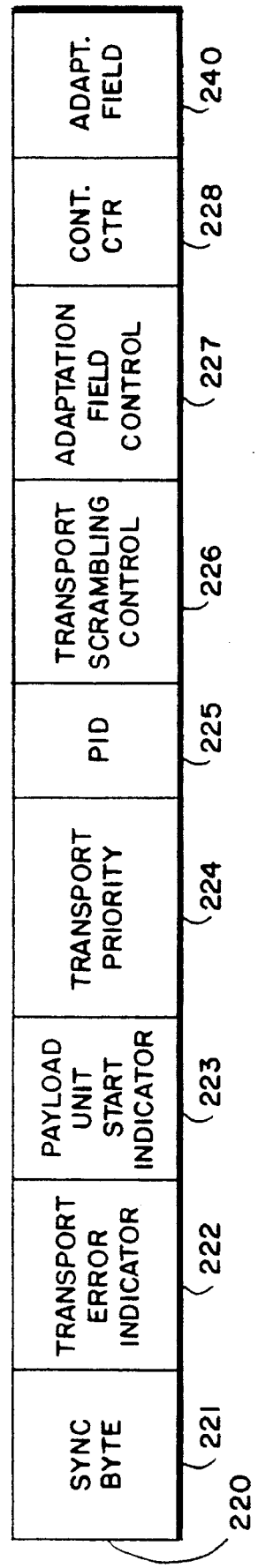

FIG. 3 shows the bit fields of the header 220 in greater detail. The fields include a sync byte 221, a transport error indicator 222, a payload unit start indicator 223, and a transport priority indicator 224. A packet identification (PID) 225 is thirteen bits. Following the PID 225 are a transport scrambling control 226, an adaptation field control 227, a continuity counter 228, and an adaptation field 240.

The adaptation field 240 is shown in greater detail in FIG. 4. The adaptation field 240 includes an adaptation field length 241, a discontinuity indicator 242, a random access indicator 243, an elementary stream priority indicator 244, a PCR flag 245, an OPCR flag 246, a splicing point flag 247, a transport private data flag 248, an adaptation field extension flag 249, optional fields 250, and pad bytes 229.

Figure 5:
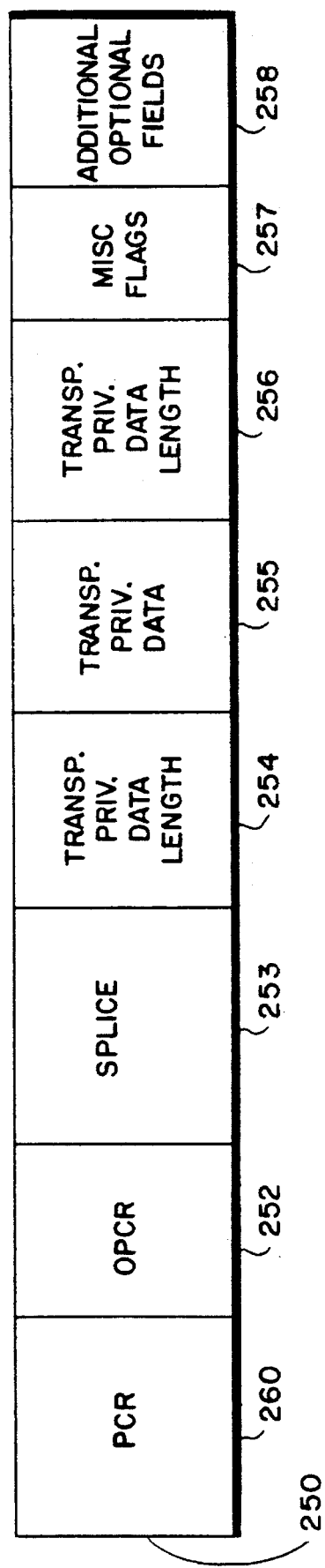

The optional fields 250 are shown in greater detail in FIG. 5. These bit fields, if the appropriate flag bits are set to "1" include a program clock reference (PCR) 260, an OPCR 252, a splice count down 253, a transport private data length 254, a transport private data 255, an adaptation field extension length 256, miscellaneous flags 257, and additional optional fields 258, which may be present when the appropriate miscellaneous flags are set to "1."

Figure 6:
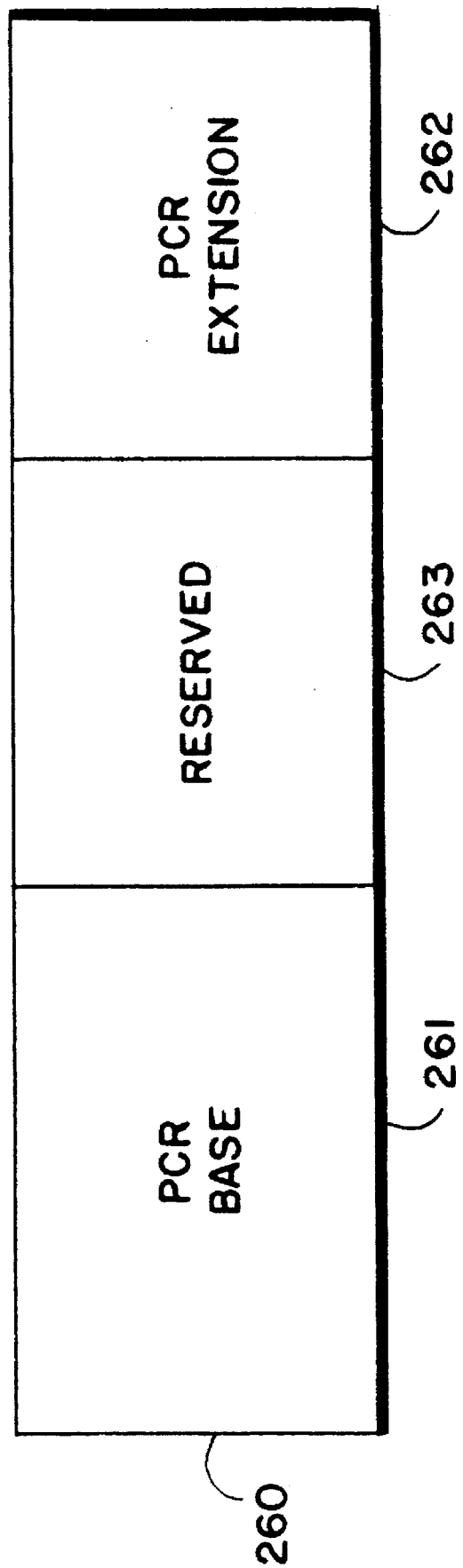

The PCR 260 is shown in greater detail in FIG. 6. The PCR 260 includes a thirty-three bit PCR base 261, a nine bit PCR extension 262, and a six bit reserved field 263.

The forty-two bits of the PCR base 261 and the PCR extension 262, in combination, encode the relative time of the program as maintained by a reference clock local to the encoder 114. Note, the PCR extension 262 is reset to zero upon reaching a count of three hundred, this "overflow" causes the PCR 261 to increment. The PCR 261–262 are used by the CPE 122 of FIG. 1 during reconstruction of the program to ensure that the audio and video signals are presented at their original program rate. These timing signals are required since the encoder 114 can generate a variable number of bits for a given unit of program time. For example, static or slow moving monochromatic images of a program may require less bits to encode than rapidly moving images, or images with a lot of visual detail. Similar variation in encoding rates are possible for audio signals. In addition, the encoder 114 operates independent of the network clock 131. Therefore, in order to properly reconstruct the program from the delivered bit stream, the relationship between the bits of the bit stream and the time of the original source program must be made known to the CPE 122. The MPEG standard specifies that the PCRs 260 are added to the bit stream 200 at time intervals not to exceed 100 milliseconds, thus data skew during reconstruction is minimized.

As stated above, synchronous communications networks require that the bit stream be delivered at a constant rate, a rate which may not be known until the circuit 132 is established. In accordance with the principles of the invention, specific embodiments which will be described in detail below, the video-on-demand system 100 is provided with the transport controller 800. The transport controller 800 "meters out" the bit stream 200 at a rate which is synchronized with the synchronous signaling rate of the network 130 while maintaining the correct program time. The metering of the bit stream 200 is synchronized even if the bit stream 200 was encoded to transport at a rate which is different from the rate of the circuit 132 which is actually used to deliver the program.

The transport controller 800 effectively operates as a traffic light at the port 119. The traffic light controls access onto the information highway, e.g. the network 130. For example, the program 113 was encoded into the bit stream

200 under the assumption that the bit stream 200 would be delivered over the network 130 at a rate of 3.5 Mb/s. However, the circuit 132 that is allocated to transport the bit stream 200 actually communicates at 4.0 Mb/s. This is a much higher rate than what was assumed during encoding. If this bit stream were transported using prior art techniques, the program time would quickly become out of step. Therefore, in this case the transport controller 800 periodically adjusts the rate of presentation of the bit stream 200 to the port 119 by a period of time which corresponds to 0.5 Mb/s to match the actual transport rate, e.g. 4.0 Mb/s.

As a brief introduction, the transport controller 800 receives the bit stream 200 including the PCRs 260. The controller 800 also maintains a local clock reference which is derived from the network clock 131. Prior to transport, the transport controller 800 extracts the PCRs 260 from the bit stream 200 and compares the extracted PCRs 260 with the local clock reference. If it is determined that the bit stream 200 is being delivered at a rate which advances the PCRs 260 relative to the local clock reference, the traffic light is turned to red. While the traffic light is red, delivery of the bit stream 200 is suspended. When the network 130 "catches-up" with the PCRs, the traffic light turns green, and delivery of the bit stream 200 can be resume.

Figure 7:
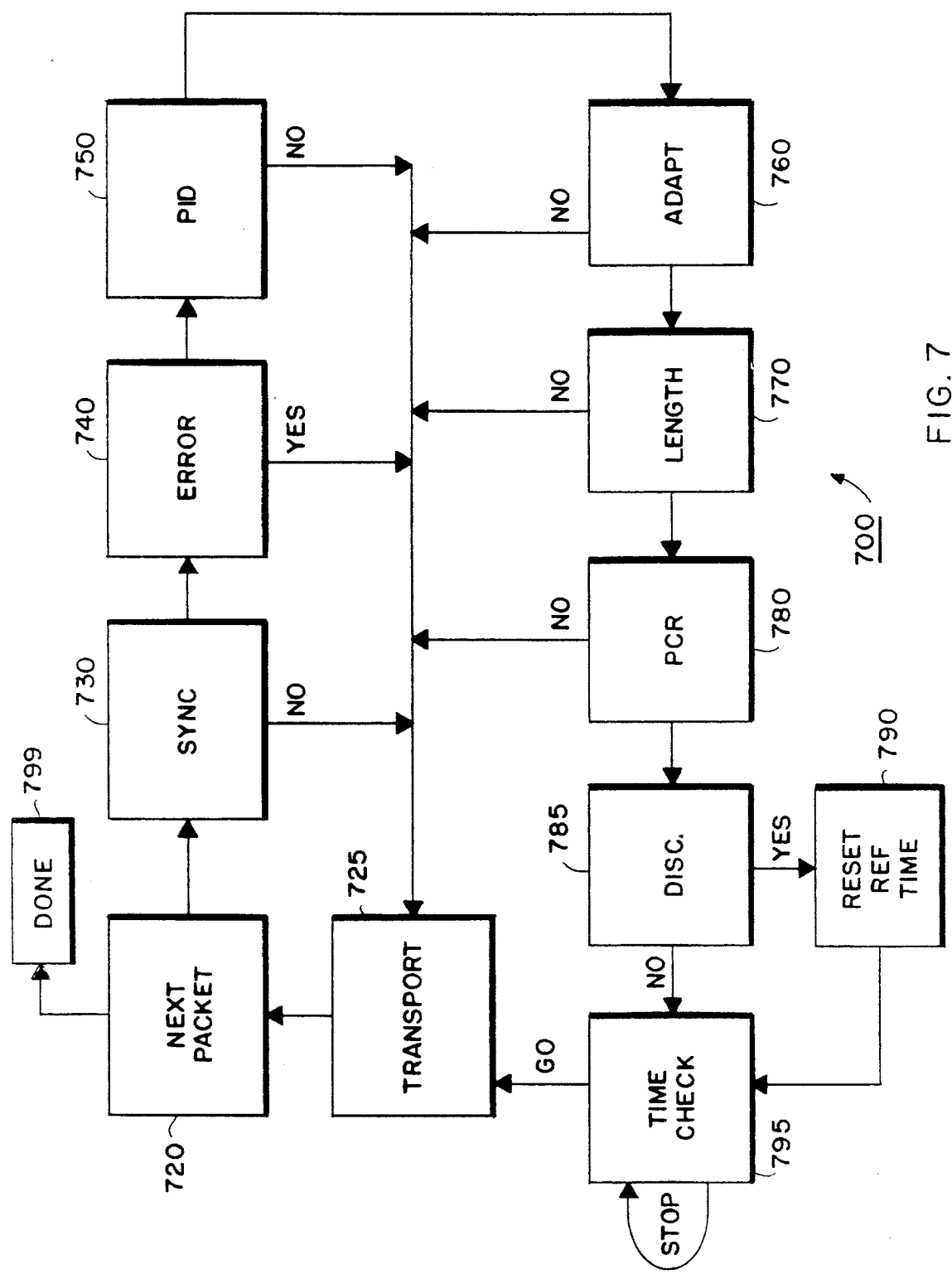
FIG. 7 is a flow diagram of a process to control the transport of the bit stream of FIGS. 2–6 over a synchronous communications network.

Turning now to FIG. 7, there is shown a preferred embodiment of a process 700 for "metering" the bit stream 200. In response to a subscriber demanding delivery of a program, the communication circuit 132 of FIG. 1 is established between the repository 110 and the CPE 122.

In step 720, the transport controller 800 receives a next packet 210 of the bit stream 200 of the selected program until all of the packets 210 have been delivered and the process 700 is done, step 799. In step 730, the validity of the sync byte 221 of the header 220 is determined. If the sync byte 221 is not valid, transport the current packet, step, and receive the next packet 210, e.g. step 720. Otherwise, if the sync byte 221 is valid, determine if the transport error indicator 222 is set to a logical "1" in step 740. If it is, transport the current packet, step 725, and receive the next packet, step 720. In step 750, determine if the PID 225 is for the current PCR. If it is not, transport the current, and receive the next packet, steps 725 and 720.

Otherwise, if the current packet 210 is for the PCR of the selected program, then, in step 760, determine if the adaptation field control 227 indicates the presence of the adaptation field 240. If there is no adaptation field 240, transport current packet, step 725, and receive the next packet, step 720.

Otherwise, in step 770, determine if the adaptation field length 241 is greater than zero. If not, transport the current packet and receive next packet. Otherwise, determine if the PCR flag 245 is set to logical "1" in step 780. If there is no PCR 260, transport the current packet, and receive next packet.

Otherwise, if the current packet 210 does include a PCR 260, determine if the discontinuity indicator 242 is set to a logical "1" in step 785. The discontinuity indicator 242 is set by the encoder 114 whenever the PCR 260 is reset to a new relative program time base value. The PCR 260 is reset, for example, at the beginning of the program, or at points in the program where there is a discontinuity in the "motion" of the program. A discontinuities can be created by "splicing" scenes, which were encoded separately, into a single continuous sequence.

If the discontinuity indicator 242 is not set, continue with step 795 to process the PCR 260. Otherwise, in step 790, determine the difference between the current local clock reference, as derived from the network clock 131, and the current PCR 260. This step normalizes the program clock references with respect to the local clock reference. Remember, the PCR 260 includes the 33 bits of program clock reference base 261 and the nine bits of the PCR extension 262. Store this normalized value, as a "local base clock reference" in a memory or a register associated with the selected program. Continue with step 795 to process the PCR 260.

Step 795 is used to process the PCRs 260. That is, in step 795, it is determined if the bit stream 200 is "metered" out to the network at a rate which will advance the program time as indicated by the PCRs 260. In step 795, subtract the current PCR 260 from the sum of the stored local base clock reference for the selected program and the current local clock reference to generate a "delta" clock reference. If the delta clock reference is positive, e.g. greater or equal than zero, transport the current packet, and receive the next packet, e.g. green light. If the delta clock reference is negative suspend transport, e.g. red light. Transport of the bit stream can be resumed once the delta clock reference becomes a positive value, e.g. the local clock reference catches up to the PCR 260. While the delivery of the bit stream 200 is suspended, the transport controller 800 can generate the pad bits to maintain a continuous bit stream on the network 130.

Figure 8:
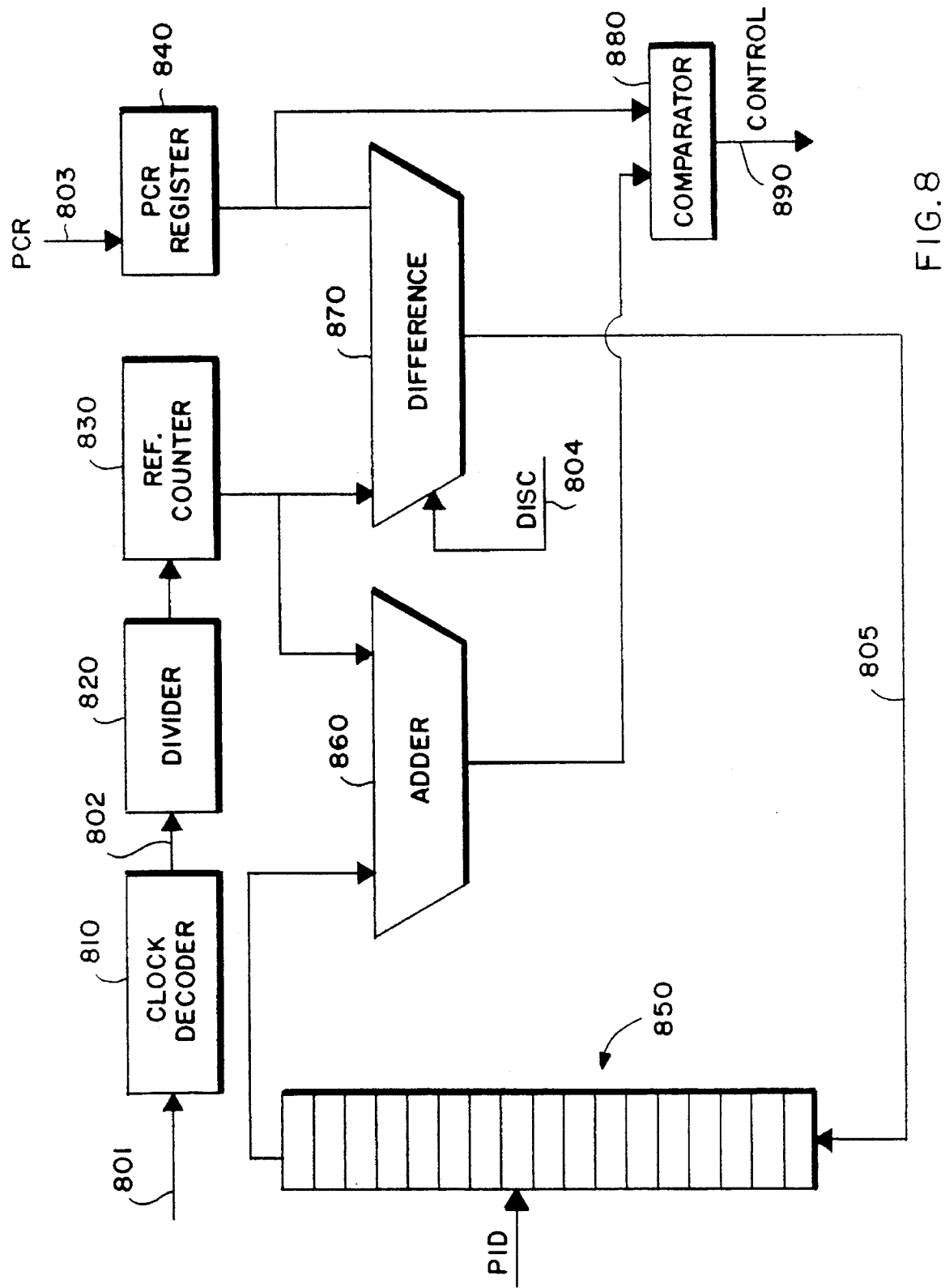
FIG. 8 is a block diagram of a transport controller which implements the process of FIG. 7 according to a preferred embodiment of the invention.

Turning now to FIG. 8, there is shown a block diagram of the transport controller 800 according to a preferred embodiment of the invention and the process 700 of FIG. 7. The controller 800 includes a clock decoder circuit 810 connected to receive the network clock signals on line 801.

A well known technique for embedding clock signals in a synchronous bit stream uses what is commonly called "Differential Manchester Encoding." Circuits to extract embedded, or "self-clocking" timing signals from a synchronous data signals are also well known in the prior art.

An output of the decoder 810 is connected to a clock divider circuit 820. An output of the divider circuit 820 is coupled to a local clock reference counter 830. The controller 800 also includes a PCR register 840, a random access memory (RAM) 850, an adder circuit 860, a difference circuit 870, and a comparator circuit 880. The number of bits of the local clock reference counter 830 and the PCR register 840, as well as the cells of the RAM 850 match the size of the PCRs, e.g. forty-two bits. The counter 830 is incremented in the same manner as the PCRs, e.g., the low order nine bits are reset to zero upon reaching a count of three hundred which causes the high order thirty-three bits to increment.

The adder 860 is connected to receive input from the RAM 850 and the local clock reference counter 830. The difference circuit 870 is connected to receive input from the local clock reference counter 830 and the PCR register 840. The PCR register 840 is connected to receive the PCRs 261–262 extracted from the bit stream 200.

The comparator 870 is connected to receive input from the adder 860 and the PCR register 840. The output of the comparator 880 is a control signal carried on line 890. The control signal being, for example, logically high to indicate continue transport of the bit stream, e.g. green light, and logically low while transport is suspended, e.g. red light.

During operation of the controller 800, the network clock signals are received on wire 801. The clock decoder 810 extracts the network timing signals and presents the timing signals as digital pulses on line 802 to the divider 820.

The divider circuit converts the network clock signals, e.g. 149.76 MHz, to the local clock reference signals on line 803. The local clock reference signals have a predetermined rate of, for example, 27 MHz The local clock reference signals are used to increment the local clock reference counter 830. The PCR register 840 is loaded with the PCRs, via line 803, as the bit stream 200 is received and processed. The difference circuit 870 is activated by the discontinuity indicator 242 produced on wire 804. The difference circuit 870 generates the normalized local base clock reference on line 805. This value is stored in a cell of the RAM 850 having an address which is computed as a function of the identification of the selected program. Thus, the controller 800 can maintain different local base clock references for multiple bit streams being concurrently delivered.

Whenever a PCR is loaded into the PCR register 840, the adder 860 is activated to sum the local base clock reference for the selected program stored in the RAM 850 and the current local clock reference stored in the local clock reference counter 830. The comparator 880 then compares this sum with the PCR of the current packet, e.g. the comparator generates the "delta clock reference." The control signal generated by the comparator 880 on line 890 is used to enable or disable transport of the bit stream 200, depending whether the delta clock reference is positive or negative, respectively.

The advantages here, when compared with traditional synchronous delivery mechanisms, are several. The encoder 114 can encode all source programs to bit streams to be delivered at some arbitrary network transport rate, with a minimal amount of padding. This very compact encoded bit stream will consume less storage at the repository 110. In addition, these bit streams can be deliver over network circuits having faster signalling rates than was assumed at the time of encoding, without having to re-encode the source program, as is the case in the prior art.

Figure 9:
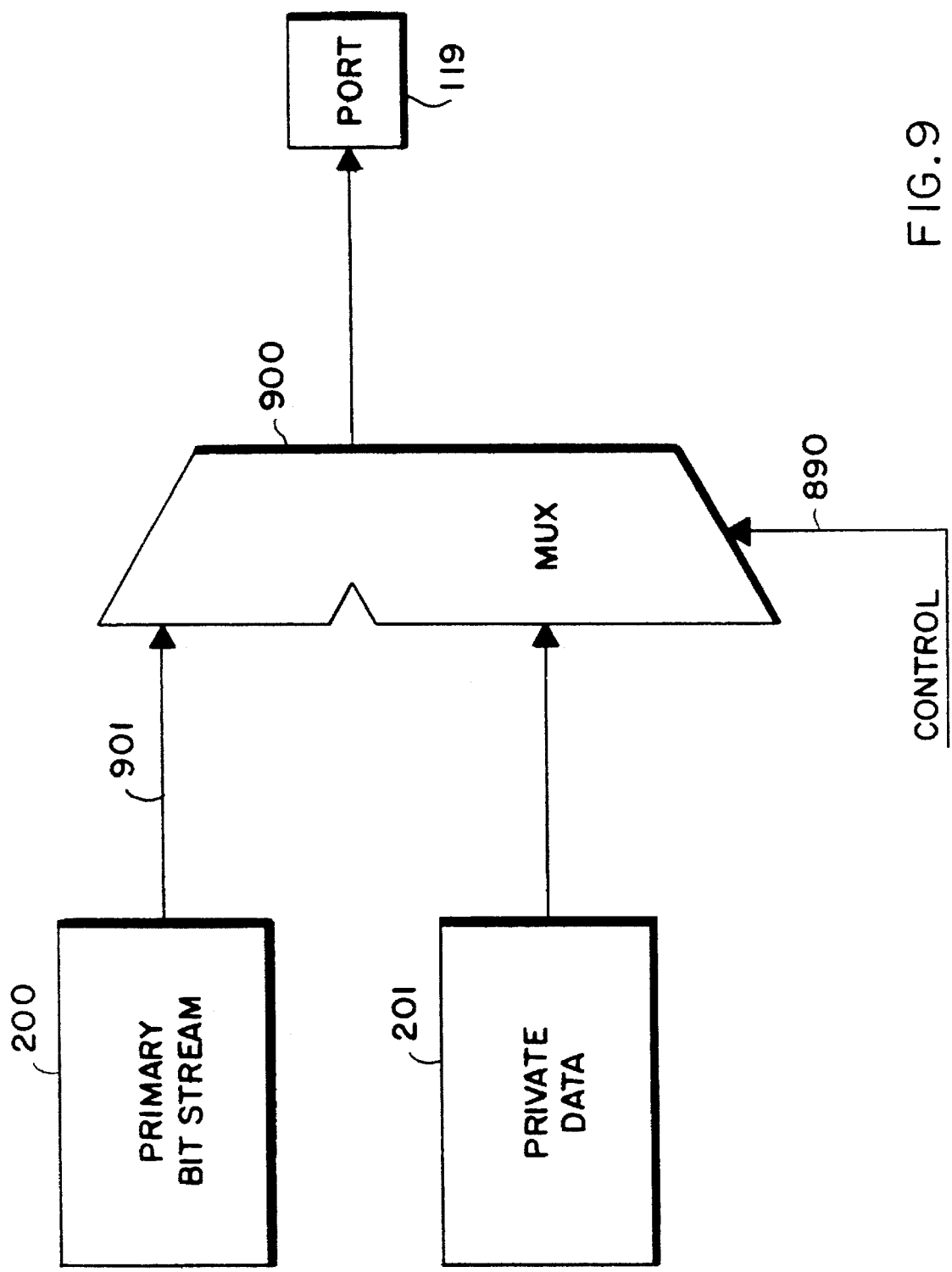
FIG. 9 is a block diagram of an arrangement for multiplexing multiple bit streams for transport over the network.

These advantages can be further capitalized on in a further embodiment of the invention shown in FIG. 9. The MPEG standard admits the encoding of "private" data as indicated by, for example, the transport private data flag 248 of FIG. 4. The private data does not necessarily need to be delivered at a carefully timed rate. For example, the private data can be completely untimed. The private data can represent, for example, static menus, or video text, and the like. Therefore, in one embodiment of the invention, the bit stream presented to the port 119 can come from multiple program sources.

FIG. 9 show a multiplexer 900 configure to receive, as a first input on line 901, bits of the primary bit stream 200, e.g. the selected program. As a second input, the multiplexer 900 is also connected to receive bits from a secondary, private bit stream 201. The control signals on wire 890 are used to select either the first or second input of the multiplexer 900. Thus, while transport of the primary bit stream 200 is suspended, the available network bandwidth can be utilized to transport additional program dam, e.g. the private secondary bit stream 201.

It will be understood, by those skilled in the arts, that the multiplexing techniques described herein can be used to interleave traffic from any number of program sources, as long as the bandwidth required to transport the interleaved bit stream does not exceed the capacity of the network.

The principles of the invention have been described with respect to specific embodiments. It will be apparent to those skilled in the art that various modifications can be made to the embodiments shown. For example, the encoder 114 can encode data according to standards other than MPEG. The apparatus and methods disclosed herein can be used to multiplex gapped constant bit rate transmissions of any data, not necessarily video data, which include clock reference signals. Therefore, the spirit and scope of the invention are set out in the appended claims.

We claim:

1. A method for controlling the communication of a bit stream over a synchronous communications network, the network to communicate the bit stream using network clock signals, comprising:

generating local clock reference signals, the local clock reference signals derived from the network clock signals;

receiving the bit stream while generating the local clock reference signals, the bit stream including program clock reference signals, the program clock signals being independent of the network clock signals;

extracting the program clock reference signals from the bit stream;

normalizing the program clock reference signals with respect to the local clock reference signals;

comparing, after normalization, the program clock reference signals with the local clock reference signals to generate delta clock reference values, the delta clock reference values being a relative difference between the program clock reference signals and the local clock reference signals;

in response to the delta clock reference values being positive, transporting the bit stream over the network; and in response to the delta clock reference values being negative, suspending transport of the bit stream over the network.

2. The method of claim 1 further comprising:

while the transport of the bit stream is suspended, transporting a second bit stream over the network.

3. An apparatus for controlling the communication of a bit stream over a synchronous communications network, the network to communicate the bit stream at a rate which is synchronized to network clock signals, comprising:

a decoder generating local clock reference signals, the local clock reference signals derived from the network clock signals;

a counter connected to the decoder, the counter incremented by the local clock reference signals;

means for receiving the bit stream while generating the local clock reference signals, the bit stream including program clock reference signals, the program clock reference signals being independent of the network clock signals;

means for extracting the program clock reference signals from the bit stream;

means for storing the program clock reference signals extracted from the bit stream while receiving the bit stream;

means for normalizing the program clock reference signals with respect to the local clock reference signals;

a comparator to compare, after normalization, the program clock reference signals with the local clock reference signals to generate delta clock reference values, the delta clock reference values being a relative difference between the program clock reference signals and the local clock reference signals;

means, responsive to the timing values being positive, for transporting the bit stream over the network; and means, responsive to the timing values being negative, for suspending transport of the bit stream over the network.

4. A method for controlling the communication of a bit stream over a synchronous communications network, the bit stream including program clock reference signals, the network to communicate the bit stream using network clock signals, the network clock signals and the program clock reference signals being independent of each other, comprising:

generating local clock reference signals derived from the network clock signals;

receiving the bit stream while generating the local clock reference signals;

extracting the program clock reference signals from the received bit stream;

transporting the bit stream over the network at a rate synchronized with the network clock signals while substantially synchronizing the program clock reference signals to the local clock reference signals.

* * * * *